United States Patent
Heap et al.

(10) Patent No.: US 8,121,768 B2
(45) Date of Patent: Feb. 21, 2012

(54) METHOD FOR CONTROLLING A HYBRID POWERTRAIN SYSTEM BASED UPON HYDRAULIC PRESSURE AND CLUTCH REACTIVE TORQUE CAPACITY

(75) Inventors: Anthony H. Heap, Ann Arbor, MI (US); Jy-Jen F. Sah, West Bloomfield, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 699 days.

(21) Appl. No.: 12/251,461

(22) Filed: Oct. 15, 2008

(65) Prior Publication Data

US 2009/0118935 A1 May 7, 2009

Related U.S. Application Data

(60) Provisional application No. 60/985,632, filed on Nov. 5, 2007.

(51) Int. Cl.
*G06F 19/00* (2011.01)
(52) U.S. Cl. .............................. 701/54; 701/51; 477/110
(58) Field of Classification Search ............. 701/51, 701/54, 55, 79, 99; 477/110, 115; 180/65.285; 903/945
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 7,673,714 B2 * | 3/2010 | Soliman et al. | 180/65.265 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |

(Continued)

*Primary Examiner* — Gertrude Arthur Jeanglaude

(57) ABSTRACT

A powertrain system includes an engine coupled to an electro-mechanical transmission to transfer power between the engine and a plurality of torque generating machines and an output member. The transmission is operative in one of a plurality of operating range states through selective application of torque transfer clutches and the engine is operatively coupled to a main hydraulic pump to supply pressurized fluid to a hydraulic circuit operative to apply the torque transfer clutches. A method for controlling the powertrain system includes determining an output torque request to the output member, determining a pressure output of the main hydraulic pump based upon an engine input speed, calculating a clutch reactive torque capacity for each applied torque transfer clutch based upon the pressure output of the main hydraulic pump, and determining a preferred engine input speed to achieve the clutch reactive torque capacity to meet the output torque request to the output member.

15 Claims, 8 Drawing Sheets

U.S. PATENT DOCUMENTS

| | | |
|---|---|---|
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0246274 A1* | 10/2007 | Dreibholz et al. ............ 180/65.2 |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1* | 5/2009 | Heap et al. ..................... 477/3 |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |

| | | | | | | |
|---|---|---|---|---|---|---|
| 2009/0118933 A1 | 5/2009 | Heap | | 2009/0118949 A1 | 5/2009 | Heap |
| 2009/0118934 A1 | 5/2009 | Heap | | 2009/0118950 A1 | 5/2009 | Heap |
| 2009/0118936 A1 | 5/2009 | Heap | | 2009/0118951 A1 | 5/2009 | Heap |
| 2009/0118937 A1 | 5/2009 | Heap | | 2009/0118952 A1 | 5/2009 | Heap |
| 2009/0118938 A1 | 5/2009 | Heap | | 2009/0118954 A1 | 5/2009 | Wu |
| 2009/0118939 A1 | 5/2009 | Heap | | 2009/0118957 A1 | 5/2009 | Heap |
| 2009/0118940 A1 | 5/2009 | Heap | | 2009/0118962 A1 | 5/2009 | Heap |
| 2009/0118941 A1 | 5/2009 | Heap | | 2009/0118963 A1 | 5/2009 | Heap |
| 2009/0118942 A1 | 5/2009 | Hsieh | | 2009/0118964 A1 | 5/2009 | Snyder |
| 2009/0118943 A1 | 5/2009 | Heap | | 2009/0118969 A1 | 5/2009 | Heap |
| 2009/0118944 A1 | 5/2009 | Heap | | 2009/0118971 A1 | 5/2009 | Heap |
| 2009/0118945 A1 | 5/2009 | Heap | | 2009/0118999 A1 | 5/2009 | Heap |
| 2009/0118946 A1 | 5/2009 | Heap | | 2009/0144002 A1 | 6/2009 | Zettel |
| 2009/0118947 A1 | 5/2009 | Heap | | | | |
| 2009/0118948 A1 | 5/2009 | Heap | | | | |

* cited by examiner

METHOD FOR CONTROLLING A HYBRID POWERTRAIN SYSTEM BASED UPON HYDRAULIC PRESSURE AND CLUTCH REACTIVE TORQUE CAPACITY

CROSS REFERENCE TO RELATED APPLICATIONS

This application claims the benefit of U.S. Provisional Application No. 60/985,632, filed on Nov. 5, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The Machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A powertrain system includes an engine coupled to an electro-mechanical transmission to transfer power between the engine and a plurality of torque generating machines and an output member. The transmission is operative in one of a plurality of operating range states through selective application of torque transfer clutches and the engine is operatively coupled to a main hydraulic pump to supply pressurized fluid to a hydraulic circuit operative to apply the torque transfer clutches. A method for controlling the powertrain system includes determining an output torque request to the output member, determining a pressure output of the main hydraulic pump based upon an engine input speed, calculating a clutch reactive torque capacity for each applied torque transfer clutch based upon the pressure output of the main hydraulic pump, and determining a preferred engine input speed to achieve the clutch reactive torque capacity to meet the output torque request to the output member.

BRIEF DESCRIPTION OF THE DRAWINGS

One or more embodiments will now be described, by way of example, with reference to the accompanying drawings, in which.

DETAILED DESCRIPTION

Figure 1:
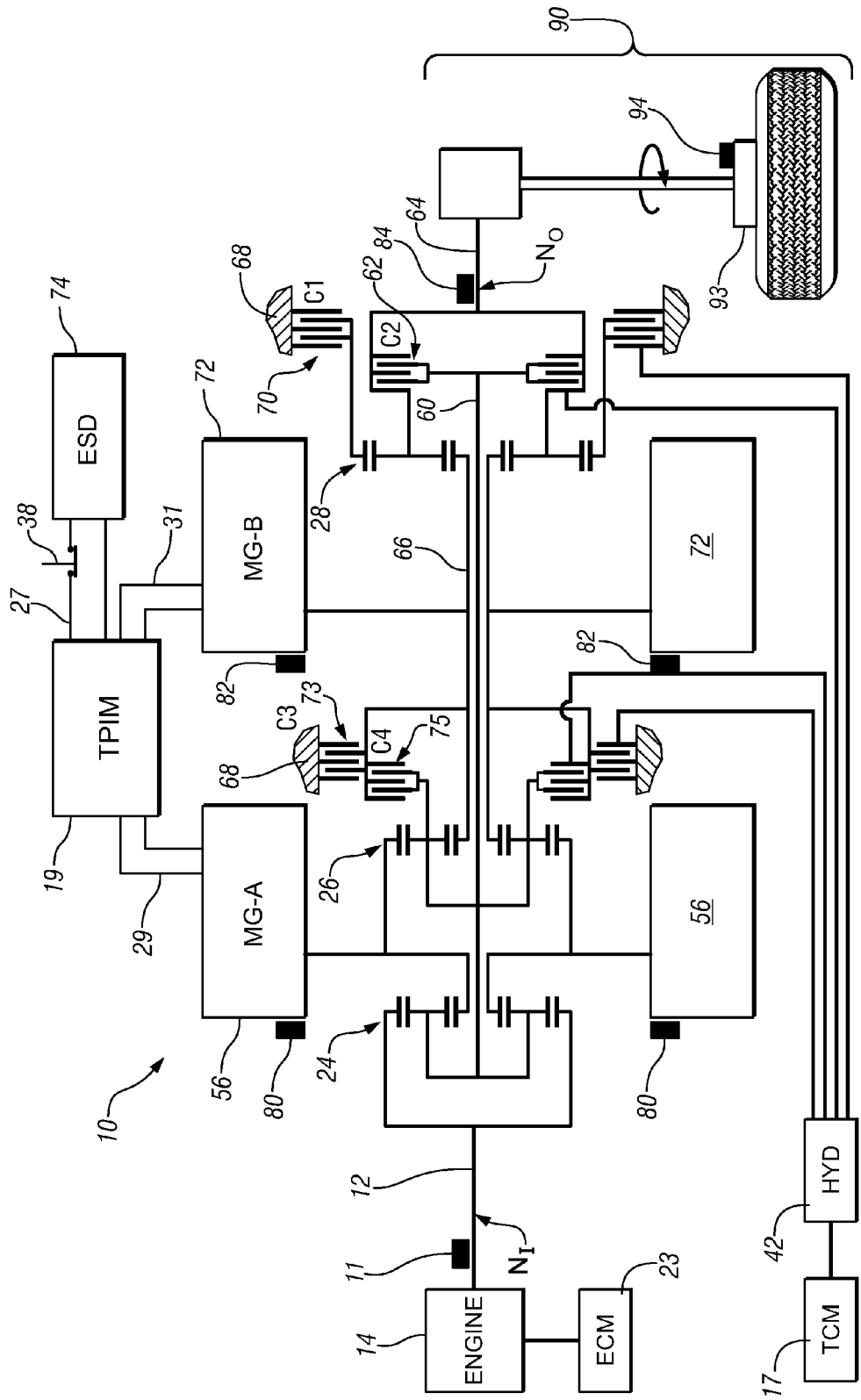
FIG. 1 is a schematic diagram of an exemplary hybrid powertrain, in accordance with the present disclosure.
Figure 2:
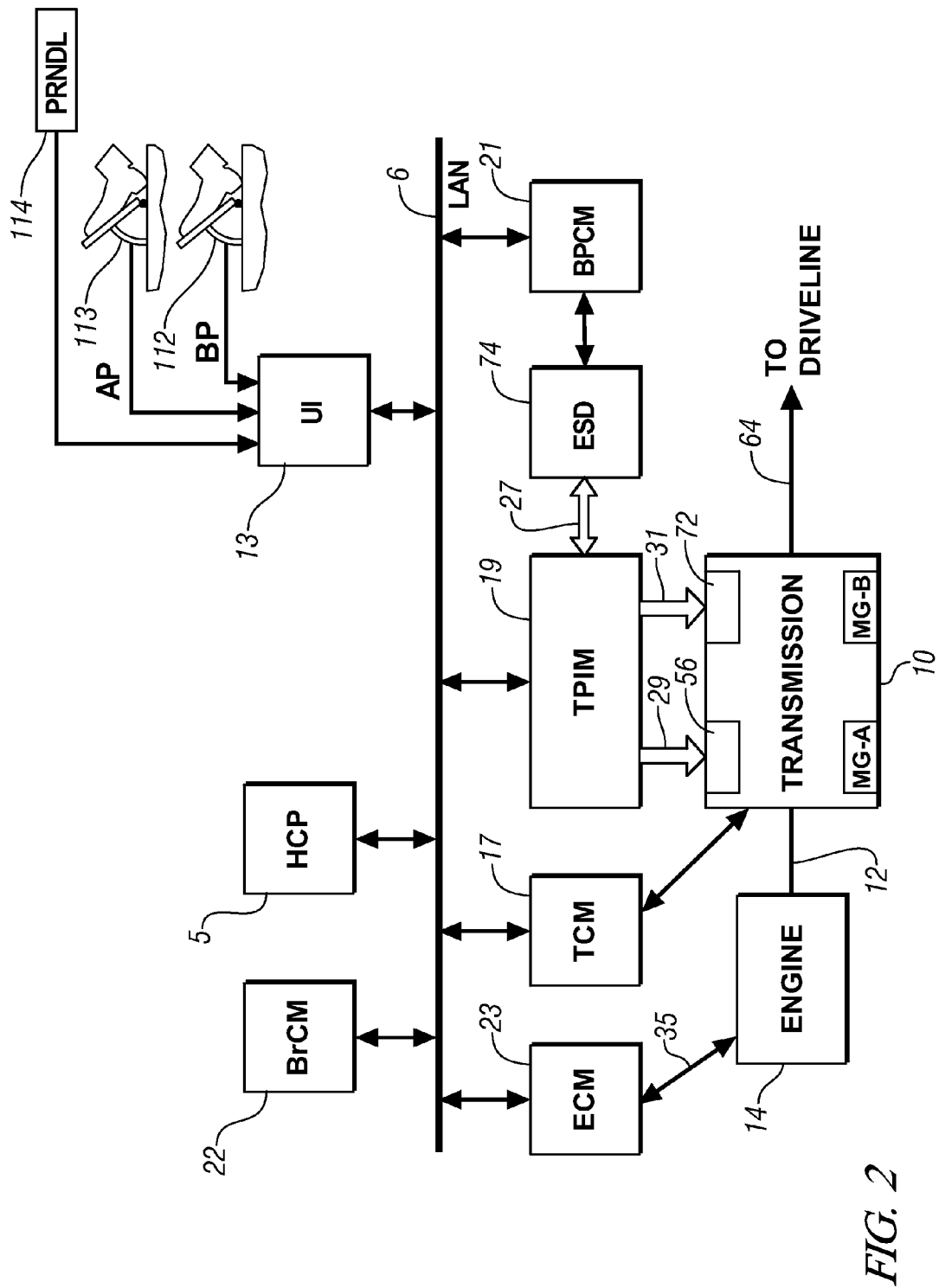
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain system. The exemplary hybrid powertrain system in accordance with the present disclosure is depicted in FIG. 1, comprising a two-mode, compound-split, electromechanical hybrid transmission 10 operatively connected to an engine 14 and torque generating machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump 88 and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. The hydraulic pump 88 supplies pressurized hydraulic fluid to a hydraulic control circuit ('HYD') 42 that is preferably controlled by a transmission control module (hereafter 'TCM') 17 operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42. Clutch pressure, and thus clutch reactive torque is based upon and limited by the hydraulic pressure in the hydraulic control circuit 42. The operation of the hydraulic control circuit 42 including the hydraulic pump 88 to generate hydraulic pressure is described hereinbelow with reference to FIG. 8.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a friction brake 94 and a sensor (not shown) adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the motor torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain system. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torque commands $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes 94 on each of the vehicle wheels 93. The BrCM 22 monitors the operator input to the brake pedal 112 and generates control signals to control the friction brakes 94 and sends a control signal to the HCP 5 to operate the transmission 10 and the first and second electric machines 56 and 72 based thereon. Braking preferably comprises a blending of friction braking and regenerative braking. Friction braking is effected by applying the friction brakes 94.

Regenerative braking is effected through the driveline 90 by selectively applying one of the clutches and controlling the first and second electric machines 56 and 72 to react torque transferred from the driveline 90 through the power inverters and respective motor control modules to meet the commanded motor torques $T_A$ and $T_B$.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generating devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, the output torque command from the transmission 10 to the driveline 90, the input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque generating machines, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
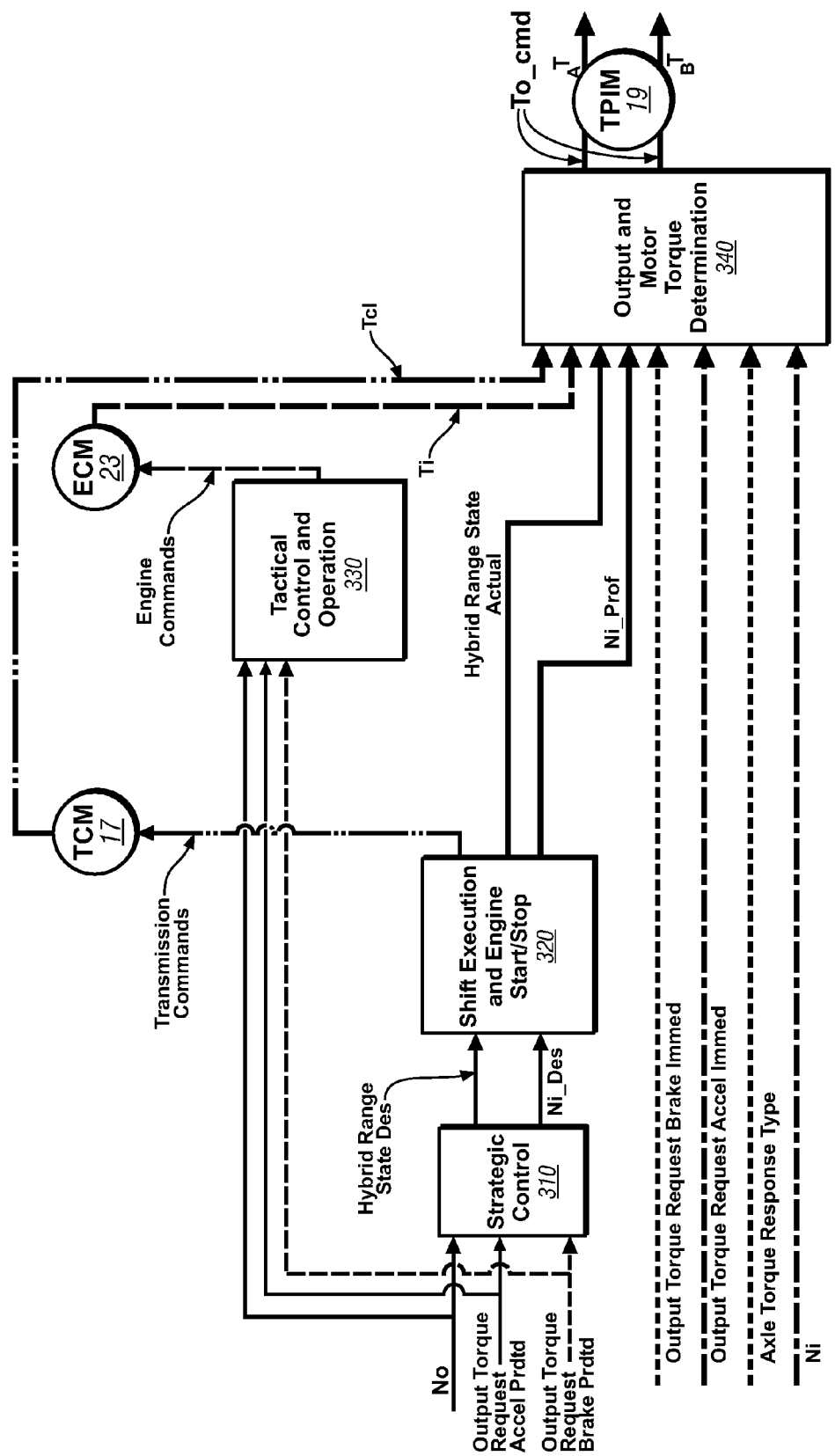
FIGS. 3-7 are schematic flow diagrams of a control scheme, in accordance with the present disclosure.

FIG. 3 shows a control system architecture for controlling and managing signal flow in a hybrid powertrain system having multiple torque generating devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generating devices, including, e.g., a hybrid powertrain system having an engine and a single electric machine, a hybrid powertrain system having an engine and multiple electric machines. Alternatively, the hybrid powertrain system can utilize non-electric torque-generative machines and energy storage systems, e.g., hydraulic-mechanical hybrid transmissions (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

The immediate accelerator output torque request is determined based upon a presently occurring operator input to the accelerator pedal 113, and comprises a request to generate an immediate output torque at the output member 64 preferably to accelerate the vehicle. The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. When commanded by the operator, there can be operating conditions under which the predicted brake output torque request is set to zero, e.g., when the operator setting to the transmission gear selector 114 is set to a reverse gear, and when a transfer case (not shown) is set to a four-wheel drive low range.

A strategic control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic control scheme 310. The strategic control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and the present input torque ('Ti') reacting between the engine 14 and the input member 12 are preferably determined in the ECM 23. Clutch reactive torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
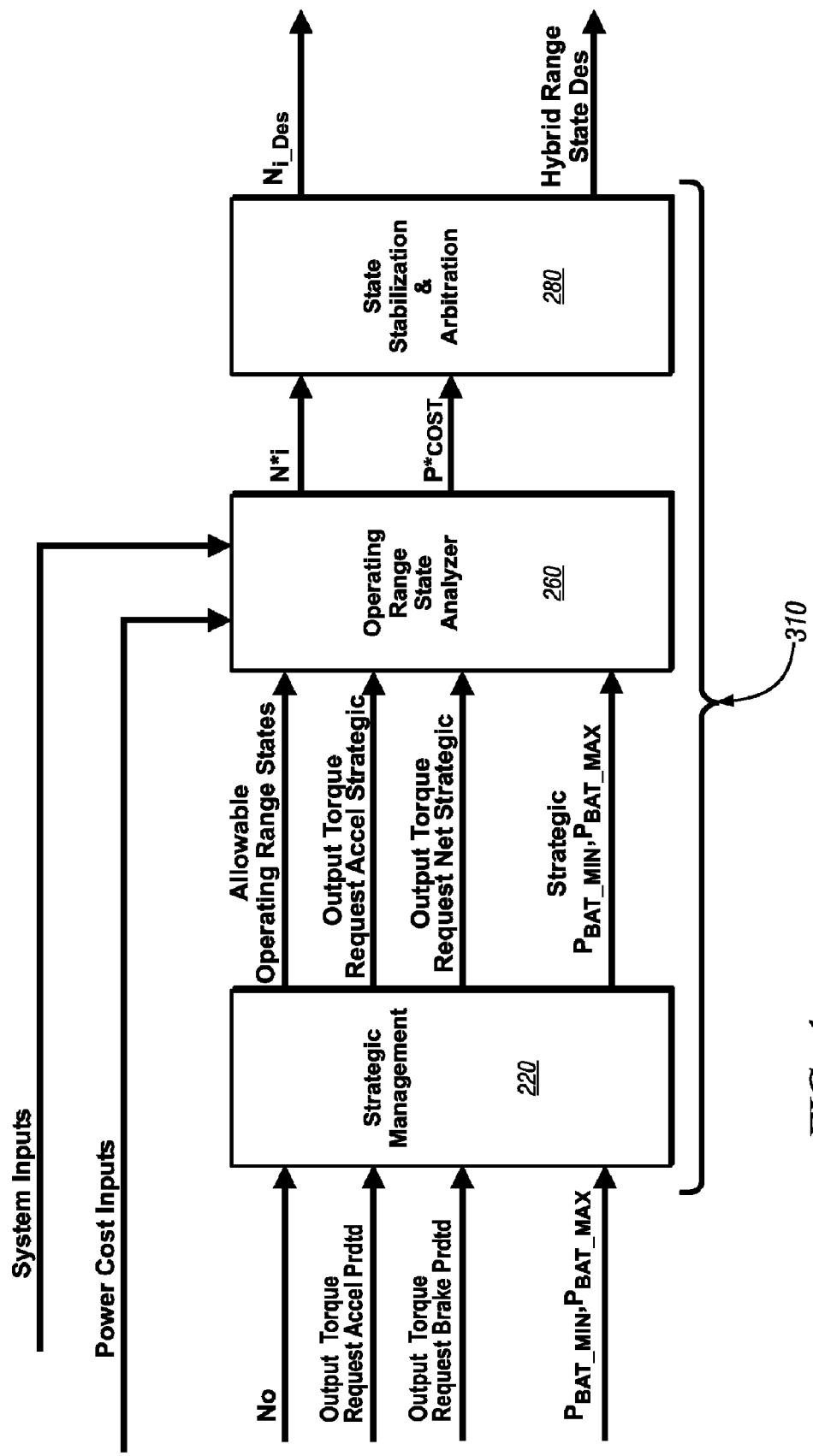

FIG. 4 details signal flow in the strategic optimization control scheme 310, which includes a strategic manager 220, an operating range state analyzer 260, and a state stabilization and arbitration block 280 to determine the preferred input speed ('Ni_Des') and the preferred transmission operating range state ('Hybrid Range State Des'). The strategic manager ('Strategic Manager') 220 monitors the output speed $N_O$, the predicted accelerator output torque request ('Output Torque Request Accel Prdtd'), the predicted brake output torque request ('Output Torque Request Brake Prdtd'), and available battery power $P_{BAT\_MIN}$ to $P_{BAT\_MAX}$. The strategic manager 220 determines which of the transmission operating range states are allowable, and determines output torque requests comprising a strategic accelerator output torque request ('Output Torque Request Accel Strategic') and a strategic net output torque request ('Output Torque Request Net Strategic'), all of which are input the operating range state analyzer 260 along with system inputs ('System Inputs') and power cost inputs ('Power Cost Inputs'). The operating range state analyzer 260 generates a preferred power cost ('P*cost') and associated input speed ('N*i') for each of the allowable operating range states based upon the operator torque requests, the system inputs, the available battery power and the power cost inputs. The preferred power costs and associated input speeds for the allowable operating range states are input to the state stabilization and arbitration block 280 which selects the preferred operating range state and preferred input speed based thereon.

Figure 5:
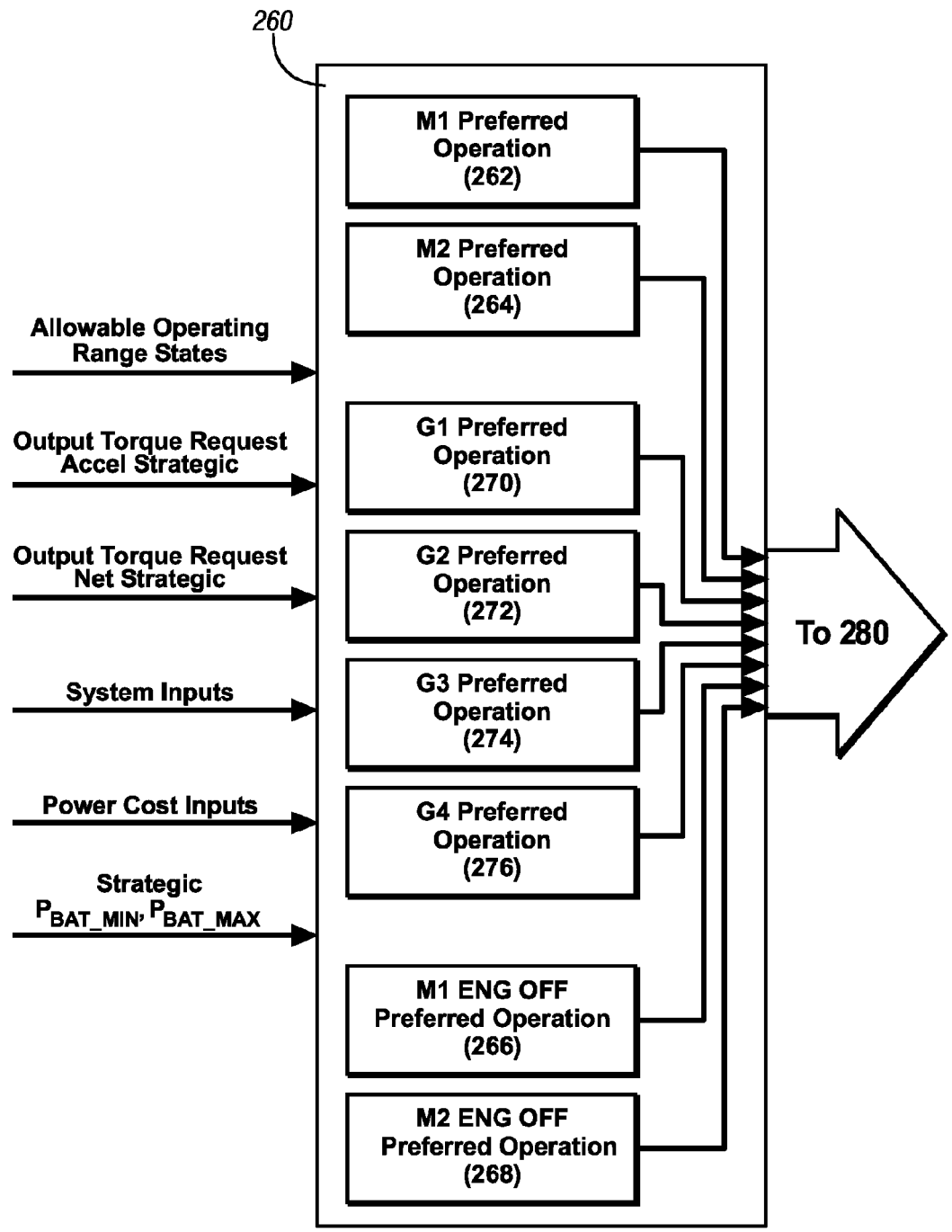

FIG. 5 shows the operating range state analyzer 260, which executes searches in each candidate operating range state comprising the allowable ones of the operating range states, including M1 (262), M2 (264), G1 (270), G2 (272), G3 (274), and G4 (276) to determine preferred operation of the torque actuators, i.e., the engine 14 and the first and second electric machines 56 and 72 in this embodiment. The preferred operation preferably comprises a minimum power cost for operating the hybrid powertrain system and an associated engine input for operating in the candidate operating range state in response to the operator torque request. The associated engine input comprises at least one of a preferred engine input speed ('Ni*'), a preferred engine input power ('Pi*'), and a preferred engine input torque ('Ti*') that is responsive to and preferably meets the operator torque request. The operating range state analyzer 260 evaluates M1-Engine Off (264) and M2-Engine Off (266) to determine a preferred cost ('P*cost') for operating the powertrain system responsive to and preferably meeting the operator torque request when the engine 14 is in the engine-off state.

Figure 6:
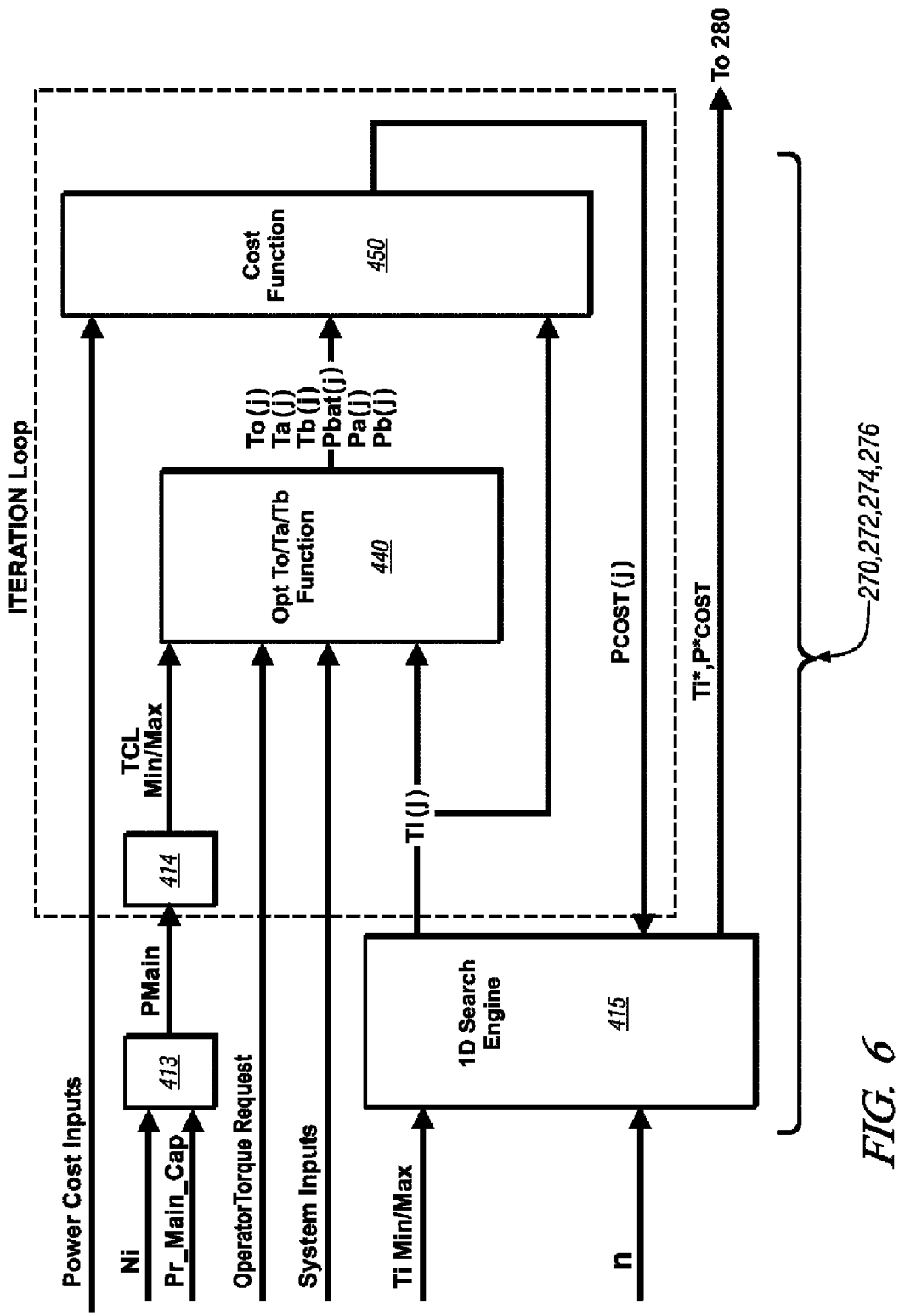

FIG. 6 schematically shows signal flow for a 1-dimension search scheme that is preferably executed for each of G1 (270), G2 (272), G3 (274), and G4 (276) to determine the preferred operation. A range of one controllable input, in this embodiment comprising minimum and maximum input torques ('Ti Min/Max'), is input to a 1-D search engine 415. The engine power output and thus engine torque input to the transmission 14 varies over the range of input speeds Ni. The input speed ('Ni') is determined in each of the candidate fixed gear operating range states based upon the gear ratio, for the transmission output speed No that is input to the strategic control scheme 310.

The 1-D search engine 415 iteratively generates candidate input torques ('Ti(j)') which range between the minimum and maximum input torques, each which is input to an optimization function ('Opt To/Ta/Tb') 440, for n search iterations. Other inputs to the optimization function 440 include system inputs comprising parametric states related to battery power, electric motor operation, transmission and engine operation, the specific operating range state and the operator torque request.

Figure 8:
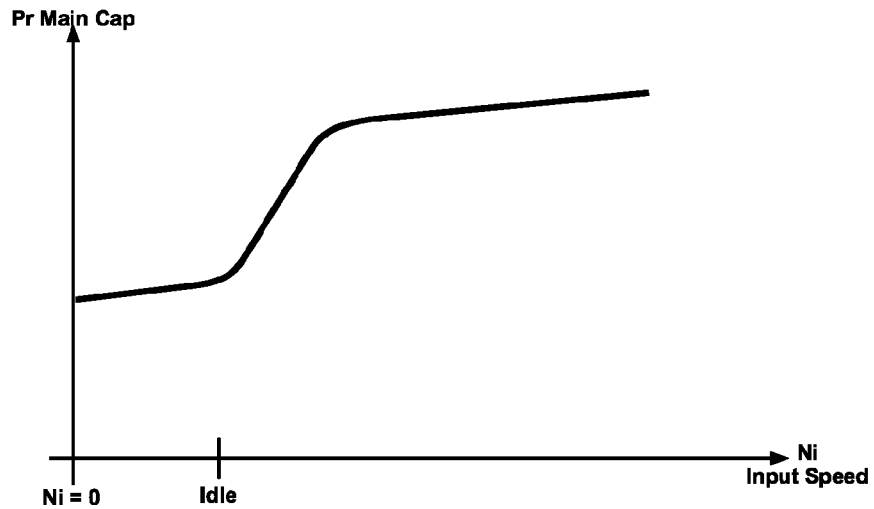
FIGS. 8 and 9 are datagraphs, in accordance with the present disclosure.

The system inputs include clutch reactive torque capacity, i.e., maximum and minimum clutch reactive torques ('TCL Min/Max') for the applied clutches for the candidate fixed gear operating range state. In operation, the input speed ('Ni') is combined with a capability of the hydraulic system to generate pressure ('Pr Main Cap') (413) to determine a main hydraulic pressure ('Pmain'). In one embodiment, the control system includes a lookup table stored in memory to determine the main hydraulic pressure based upon the input speed. FIG. 8 shows the datagraph that illustrates a capability of an exemplary hydraulic control circuit 42 including the main hydraulic pump 88 to generate hydraulic pressure ('Pr Main Cap') based upon the input speed Ni. The hydraulic control system 42 preferably includes an electrically powered auxiliary pump (not shown) that generates a minimum hydraulic pressure when the input speed is zero, i.e., the engine-off state ('Ni=0'), and when the engine 14 is operating at idle ('Idle'). When the input speed increases from zero, e.g., when the engine 14 is spinning, the main hydraulic pump 88 generates hydraulic pressure. As depicted, the hydraulic pressure in the hydraulic control circuit does not increase above the minimum hydraulic pressure until the input speed exceeds the idle speed. When the input speed exceeds the idle speed, the main hydraulic pump 88 pumps hydraulic fluid to generate hydraulic pressure that increases with increasing engine input speed, leveling off at a maximum hydraulic pressure (not shown) that can be determined based upon a capacity of the specific hydraulic pump.

The control system determines the maximum and minimum clutch reactive torques ('TCL Min/Max') based upon the hydraulic pressure capability ('Pr Main Cap') and the operating range state, which determines the specifically applied clutch(es) (414). In operation, the maximum clutch reactive torque is determined as set forth in the following equation:

$$TCL\_Max = Kn^*(P_{MAIN} - P_{RET}) \quad [1]$$

wherein Kn comprises a scalar gain term describing clutch reactive torque as a function of pressure gain for the applied clutch, $P_{MAIN}$ is the main hydraulic pressure determined based upon the engine input speed, and $P_{RET}$ is a return spring pressure for the applied clutch.

The minimum clutch reactive torque TCL Min is determined to be a negative value of the maximum clutch reactive torque.

The optimization function 440 determines transmission operation comprising an output torque, motor torques, and associated battery and electrical powers ('To(j), Ta(j), Tb(j), Pbat(j), Pa(j), Pb(j)') associated with the candidate input torque based upon the system inputs including the maximum and minimum clutch torques in response to the operator torque request for the candidate operating range state. The output torque, motor torques, and associated battery and electrical powers and power cost inputs are input to a cost function 450, which executes to determine a power cost ('Pcost(j)') for operating the powertrain at the candidate input torque in response to the operator torque request. The 1-D search engine 415 iteratively generates the candidate input torques over the range of input torques. The optimization function 440 and the cost function 450 determine power costs associated with each candidate input torque. A preferred input torque ('Ti*') and associated preferred cost ('P*cost') are identified. The preferred input torque ('Ti*') comprises the candidate input torque within the range of input torques that results in a minimum power cost of the candidate operating range state, i.e., the preferred cost.

Figure 7:
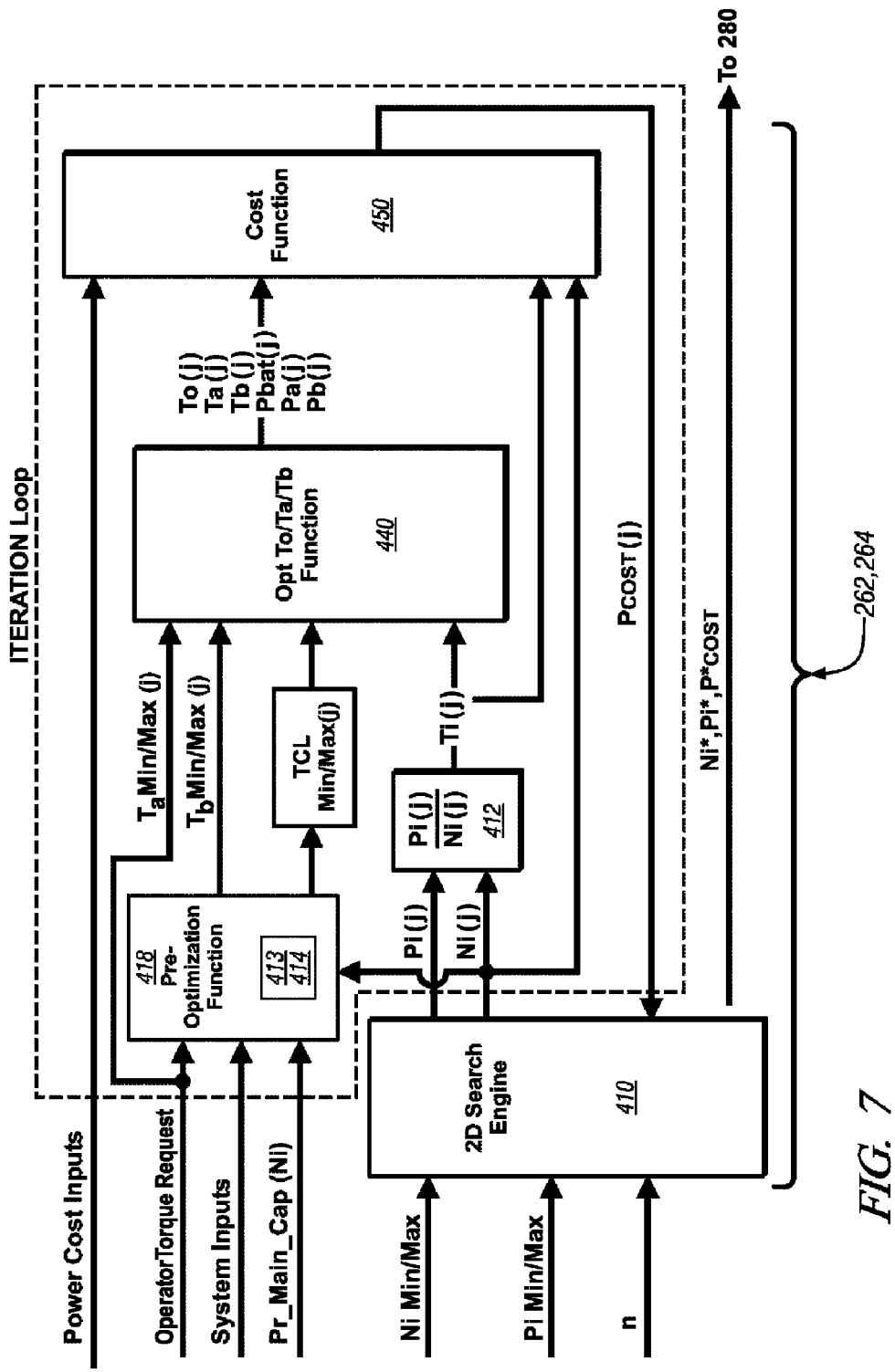

The preferred operation in each of M1 and M2 can be determined by executing a 2-dimensional search scheme that can be executed in each of M1 (262) and M2 (264), shown with reference to FIG. 7. FIG. 7 schematically shows signal flow for the 2-dimension search scheme. Ranges of two controllable inputs, in this embodiment comprising minimum and maximum input speeds ('Ni Min/Max') and minimum and maximum input powers ('Pi Min/Max') are input to a 2-D search engine 410. The 2-D search engine 410 iteratively generates candidate input speeds ('Ni(j)') and candidate input powers ('Pi(j)') which range between the minimum and maximum input speeds and powers. The candidate input power is preferably converted to a candidate input torque ('Ti(j)') (412). Each candidate input speed ('Ni(j)') is input to a pre-optimization function (418). Other inputs to the pre-optimization function (418) include the hydraulic pressure capability ('Pr_Main_Cap (Ni)') and the operating range state, as previously described.

The pre-optimization function (418) generates a range comprising maximum and minimum clutch reactive torques ('TCL_Min/Max(j)') based upon the candidate input speed Ni(j) (413, 414). Other outputs of the pre-optimization function 418 include a range of motor torques ('Ta Min/Max(j)', ('Tb Min/Max(j)') for the candidate operating point. The optimization function 440 determines transmission operation comprising an output torque, motor torques, and associated battery and electrical powers ('To(j), Ta(j), Tb(j), Pbat(j), Pa(j), Pb(j)') associated with the candidate input torque ('Ti(j)') and candidate input speed ('Ni(j)'), limited by the range of minimum and maximum input powers from the engine 14 to the transmission 10 ('Pi Min/Max') and based upon the system inputs including the maximum and minimum clutch torques and the operating torque request for the candidate operating range state. The output torque, motor torques, and associated battery powers and power cost inputs are input to a cost function 450, which executes to determine a power cost ('Pcost(j)') for operating the powertrain at the candidate input power and candidate input speed in response to the operator torque request in the candidate operating range state. The 2-D search engine 410 iteratively generates the candidate input speeds and candidate input powers over the range of input speeds and range of input powers and determines the power costs associated therewith to identify a preferred input power ('P*') and preferred input speed('Ni*') and associated preferred cost ('P*cost'). The preferred input power ('P*') and preferred input speed ('N*') comprises the candidate input power and candidate input speed that result in a minimum power cost for the candidate operating range state.

The power cost inputs to the cost function 450 are determined based upon factors related to vehicle driveability, fuel economy, emissions, and battery usage. Power costs are assigned and associated with fuel and electrical power consumption and are associated with a specific operating points of the hybrid powertrain. Lower operating costs can be associated with lower fuel consumption at high conversion efficiencies, lower battery power usage, and lower emissions for each engine speed/load operating point, and take into account the candidate operating state of the engine 14. The power costs include engine power losses, electric motor power losses, battery power losses, brake power losses, and mechanical power losses associated with operating the hybrid powertrain at a specific operating point which includes input speed, motor speeds, input torque, motor torques, a transmission operating range state and an engine state.

The state stabilization and arbitration block 280 selects a preferred transmission operating range state ('Hybrid Range State Des') which preferably is the transmission operating range state associated with the minimum preferred cost for the allowed operating range states output from the operating range state analyzer 260, taking into account factors related to arbitrating effects of changing the operating range state on the operation of the transmission to effect stable powertrain operation. The preferred input speed ('Ni_Des') is the engine input speed associated with the preferred engine input comprising the preferred engine input speed ('Ni*'), the preferred engine input power ('Pi*'), and the preferred engine input torque ('Ti*') that is responsive to and preferably meets the operator torque request for the selected preferred operating range state.

The evaluation of candidate input speeds Ni(j) based in part upon hydraulic pressure and correlative minimum and maximum clutch reactive torques ('TCL Min/Max(j)') in the operating range state analyzer 260 is intended to assure that the transmission operation comprising the output torque ('To(j)') associated with the candidate input torque ('Ti(j)') is not limited by the minimum and maximum clutch reactive torques ('TCL_Min/Max(j)') achievable at the candidate input torque.

In operation the control system acts to control the engine input speed Ni to control the clutch reactive torque capacity to effect torque transfer across the applied clutch(es). This can affect system operation at system operating conditions wherein the engine may be in an engine-off state or be operating at slow speeds, and the demand for torque transfer through the transmission 10 across the applied clutch(es) exceeds the clutch reactive torque(s) of the applied clutch(es). Under such operating conditions, the control system can act to increase the engine input speed to increase hydraulic pressure to increase the clutch reactive torque capacity. Such system operating conditions can include an operator torque request through the accelerator pedal 113 wherein the engine is at idle or in the engine-off state, such as occurs during a vehicle launch. Another system operating condition can include system operation at higher speed when an operator torque request through the accelerator pedal 113 goes to zero including an input to the brake pedal 112, which can lead to a regenerative braking operation. Under such operating conditions, the control system can act to limit a decrease in the engine input speed to limit a decrease in the hydraulic pressure to maintain the clutch reactive torque capacity sufficient to effect torque transfer through the transmission 10 to react with the first and second electric machines 56 and 72.

Figure 9:
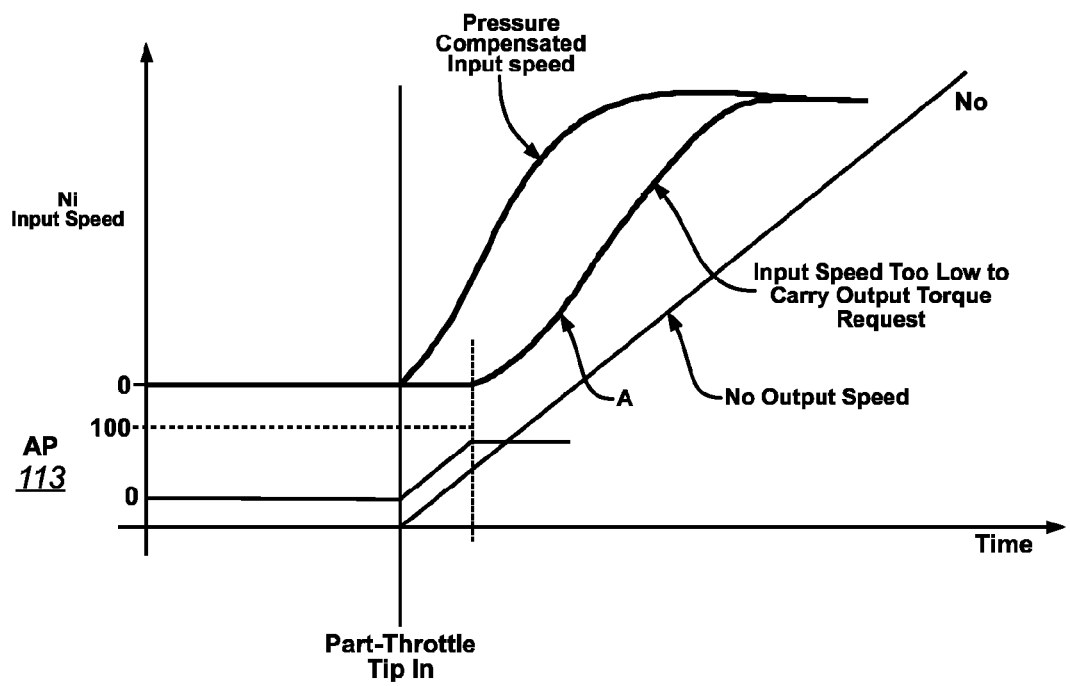

FIG. 9 shows operation of an exemplary system, including a signal input from an accelerator pedal ('AP') 113 and input speed Ni and output speed No ('No Output Speed') shown plotted over elapsed time ('Time'). At a point in time, system operation changes due to an operator input to the accelerator pedal 113 comprising a part throttle tip-in ('Part-Throttle Tip In'), which is the operator torque request used to determine the predicted accelerator output torque request and the immediate accelerator output torque request that are inputs to the control system described beginning with FIG. 3. A first line ('A') depicts the input speed operation of the engine 14 in response to the input to the accelerator pedal 113, including a response time delay and without compensation or adjustment for the clutch reactive torque capacity. The engine input speed in this condition does not spin the hydraulic pump 88 sufficiently to generate hydraulic pressure to supply pressurized hydraulic fluid to the hydraulic control circuit 42 to meet the output torque request ('Input Speed Too Low to Carry Output Torque Request'). A second line depicts the input speed operation of the engine 14 in response to the input to the accelerator pedal 113, with compensation for the clutch reactive torque using the control scheme described hereinabove ('Pressure Compensated Input Speed'). As depicted, the engine input speed in this condition increases to operate the hydraulic pump 88 to generate sufficient hydraulic pressure to supply pressurized hydraulic fluid to the hydraulic control circuit 42 to meet the output torque request.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain system including an engine coupled to an electro-mechanical transmission to transfer power between the engine and a plurality of torque generating machines and an output member, the transmission operative in one of a plurality of operating range states through selective application of torque transfer clutches and the engine operatively coupled to a main hydraulic pump to supply pressurized fluid to a hydraulic circuit operative to apply the torque transfer clutches, the method comprising:

determining an output torque request to the output member;

determining a pressure output of the main hydraulic pump based upon an engine input speed;

calculating a clutch reactive torque capacity for each applied torque transfer clutch based upon the pressure output of the main hydraulic pump; and determining a preferred engine input speed to achieve the clutch reactive torque capacity to meet the output torque request to the output member.

2. The method of claim 1, further comprising determining a preferred operating range state for the transmission for the preferred engine input speed to achieve the clutch reactive torque capacity to meet the output torque request to the output member.

3. The method of claim 2, further comprising controlling the engine to the preferred engine input speed and controlling the transmission to the preferred operating range state to achieve the clutch reactive torque capacity to meet the output torque request to the output member.

4. The method of claim 1, further comprising:
determining the output torque request to the output member based upon an operator input to an accelerator pedal;
determining a preferred clutch reactive torque capacity to achieve the output torque request; and
controlling the engine input speed to control the pressure output of the main hydraulic pump to achieve the preferred clutch reactive torque capacity.

5. The method of claim 4, comprising increasing the engine input speed to increase the pressure output of the main hydraulic pump to achieve the clutch reactive torque capacity.

6. The method of claim 1, further comprising
determining the output torque request to the output member based upon an operator input to a brake pedal;
determining a preferred clutch reactive torque to achieve the output torque request;
determining a clutch reactive torque capacity to achieve the preferred clutch reactive torque; and
controlling the engine to the preferred engine input speed to control the pressure output of the main hydraulic pump to achieve the preferred clutch reactive torque capacity.

7. The method of claim 6, comprising maintaining the engine input speed above a threshold to maintain the pressure output of the main hydraulic pump to maintain the clutch reactive torque capacity to achieve regenerative braking.

8. The method of claim 1, further comprising:
executing searches of candidate transmission operating range states based upon the preferred engine input speed and the output torque request to the output member; and
determining preferred motor torques for the torque generating machines based upon the preferred engine input speed and the output torque request to the output member for the candidate transmission operating range states.

9. The method of claim 8, further comprising
determining power costs for the transmission operations of the candidate operating range states based upon the preferred motor torques for the torque generating machines and the preferred engine input speed; and
selecting a preferred operating range state based upon the power costs.

10. The method of claim 9, wherein the preferred operating range state comprises the candidate operating range state having a minimum power cost.

11. The method of claim 9, further comprising
determining a preferred clutch reactive torque to achieve the output torque request;
determining a clutch reactive torque capacity to achieve the preferred clutch reactive torque;
controlling the engine to the preferred engine input speed to control the pressure output of the main hydraulic pump to achieve the preferred clutch reactive torque capacity, and
controlling the transmission to the preferred operating range state.

12. The method of claim 11, further comprising controlling the torque generating machines to the preferred motor torques.

13. Method for controlling a powertrain system including an engine coupled to an electro-mechanical transmission to transfer power between the engine and a plurality of torque generating machines and an output member, the transmission operative in one of a plurality of operating range states through selective application of torque transfer clutches and the engine operatively coupled to a main hydraulic pump to supply pressurized fluid to a hydraulic circuit operative to apply the torque transfer clutches, the method comprising:
determining an output torque request to the output member;
determining a pressure output of the main hydraulic pump based upon an engine input speed;
calculating a clutch reactive torque capacity for the applied torque transfer clutch based upon the pressure output of the main hydraulic pump; and
controlling the engine to a preferred engine input speed to achieve the clutch reactive torque capacity and controlling the torque generating machines to meet the output torque request to the output member.

14. The method of claim 13, further comprising determining a preferred operating range state for the transmission for the preferred engine input speed to achieve the clutch reactive torque to meet the output torque request to the output member.

15. Method for controlling a powertrain system including a hybrid transmission operative to transfer power between an engine and a torque machine and an output member through application of torque transfer clutches, the engine operatively coupled to a main hydraulic pump to supply pressurized fluid to a hydraulic circuit operative to apply the torque transfer clutches, the method comprising:
determining an output torque request to the output member;
determining a pressure output of the main hydraulic pump based upon an engine input speed;
calculating clutch reactive torque capacity for the applied torque transfer clutch based upon the pressure output of the main hydraulic pump; and
controlling the engine to a preferred engine input speed to achieve the clutch reactive torque capacity and controlling the torque generating machines to meet the output torque request to the output member.

* * * * *